United States Patent [19]

Toohey

[11] Patent Number: 5,010,408
[45] Date of Patent: Apr. 23, 1991

[54] DOUBLY CORRELATED SAMPLE AND HOLD CIRCUIT

[75] Inventor: William J. Toohey, Pittsford, N.Y.

[73] Assignee: Eastman Kodak Company, Rochester, N.Y.

[21] Appl. No.: 412,064

[22] Filed: Sep. 25, 1989

[51] Int. Cl.⁵ .................. H04N 3/14; H04N 5/335
[52] U.S. Cl. .................. 358/213.11; 358/213.15; 358/213.16; 307/353
[58] Field of Search ............ 358/213.11, 213.15, 358/213.16, 213.17, 213.18, 163, 167, 213.23, 213.26; 307/353, 358, 352

[56] References Cited

U.S. PATENT DOCUMENTS

| | | | |
|---|---|---|---|
| 3,332,012 | 7/1967 | Frommer et al. | 324/140 |
| 3,521,141 | 7/1970 | Walton | 320/1 |
| 3,599,103 | 8/1971 | Nussbaumer | 328/135 |
| 4,079,423 | 3/1978 | Diehl | 358/213 |
| 4,096,402 | 6/1978 | Schroeder et al. | 307/362 |
| 4,255,715 | 3/1981 | Cooperman | 330/9 |
| 4,274,113 | 6/1981 | Ohba et al. | 358/212 |
| 4,283,742 | 8/1981 | Izumita et al. | 358/213 |
| 4,333,111 | 6/1982 | Noda et al. | 358/213 |
| 4,363,035 | 12/1982 | Lehmann | 358/167 |
| 4,385,321 | 5/1983 | Malm | 358/213 |
| 4,556,851 | 12/1985 | Levine | 358/213.18 |
| 4,600,843 | 7/1986 | Kizu et al. | 250/578 |
| 4,617,593 | 10/1986 | Dudley | 358/113 |
| 4,712,136 | 12/1987 | Tsunekawa et al. | 358/213.15 |
| 4,845,382 | 7/1989 | Eouzan et al. | 358/213.16 |
| 4,907,084 | 3/1990 | Nagafusa | 358/213.16 |

Primary Examiner—Tommy P. Chin
Assistant Examiner—Safet Metjahic
Attorney, Agent, or Firm—Raymond L. Owens

[57] ABSTRACT

Video processing circuitry, which cancels noise and distortions from an imaging system which has a charge coupled device, has three sample and hold circuits and a pair of source followers which are on a common semiconductor substrate and further has a differential amplifier which is not on the common substrate.

26 Claims, 2 Drawing Sheets

DOUBLY CORRELATED SAMPLE AND HOLD CIRCUIT

CROSS REFERENCE TO RELATED APPLICATIONS

This patent application is related to a copending patent application, Ser. No. 412,065, which is being filed concurrently and in which there is a common inventor and a common assignee.

FIELD OF THE INVENTION

This invention relates to solid-state imaging apparatus and in particular to distortion and noise reduction in the signal processing of video signals generated in Charge Coupled Devices (CCDs) or photodiodes.

BACKGROUND OF THE INVENTION

One popular form of solid state image sensOr iS a CCD which converts a light signal (an image) incident upon a photosensitive input electrode thereof and generates at an output electrode thereof an electrical (video) signal corresponding to the light signal. A light sensing CCD typically comprises a p type semiconductor substrate with an insulating layer of silicon dioxide covering a maJor surface thereof and a plurality of spaced apart electrodes (gates) over the insulating layer. The electrodes are photosensitive and light incident thereon effectively generates charge carriers in a portion of the substrate therebelow. AdJacent electrodes are biased such that a potential well is created in the substrate under one of the electrodes but not under the other. Light incident on a pair of adJacent electrodes induces charge carriers in the substrate under both electrodes. The charge carriers under the electrode with the well thereunder are held in the well and the charge carriers under the other electrode are attracted toward and flow into the well Charge carriers are moved in the substrate from under one electrode to another by changing the relative biasing of adjacent electrodes. Typically complementary digital voltages provide the biasing which causes charge carriers to move in the substrate from under one electrode to under the next electrode. Thus the CCD acts as a shift register with light induced charged being transferred (shifted) from one electrode to subsequent electrodes and then to an output electrode where it is read out as an electrical (video) signal. One problem with this type of image sensor is that the digital voltages used to shift (transfer) charge from under one electrode to another introduces distortion and noise into the generated video signal which is undesirable.

Another popular form of solid state image sensor uses a photodiode coupled to a CCD. The CCD is essentially as described herein above except that it does not have a photosensitive electrode. This system also introduces noise and distortion due to the operation of the CCD.

U.S. Pat. No. 4,283,742 (M. Izumita et al), issued Aug. 11, 1981, describes and shows (see FIGS. 4 and 6) signal processing circuits in block diagram. Izumita et al teaches that these circuits are capable of limiting spike noise from a solid state imaging device 11 comprising an array of photodiodes with each photodiode being connected to the source drain circuitry of a separate MOS transistor. The circuit of FIG. 6 uses three sample and hold circuits 13, 14 and 22, a monostable multivibrator 18, a pulse delay line 23 and a subtractor 17. Izumita et al is silent as to whether the components of his signal processing circuits of FIGS. 4 and 6 are on a common semiconductor substrate with the solid state imaging device 11 or if the imaging device 11 is on a separate semiconductor substrate. In either case the outputs of S/H circuits 22 and 14 of FIG. 6 couple the same noise and distortion components to the inputs of subtractor 17 thereby which effectively causing the same to be cancelled; however, the noise and distortion components also travel through the substrate and enter subtractor 17, whence and they are transmitted through subtractor 17 and appear at the output thereof.

It is desirable to be able to provide a high quality electrical representations of images from solid state imaging systems which use photosensitive CCDs or photodiodes coupled to conventional CCDs.

SUMMARY OF THE INVENTION

The present invention is directed to video image processing circuitry fOr use as part Of an imaging system that includes a light sensitive Charge Coupled Device (CCD) or a photodiode (or photodiode array) coupled to a conventional CCD. The photosensitive CCD generates from light (an image) incident thereon an electrical signal which includes noise and distortion. The processing circuitry effectively cancels the noise and distortion so as to provide a close to ideal electrical representation of the image.

In one embodiment the circuitry is adapted to be coupled to solid state imaging apparatus which selectively generates a reference signal that includes undesirable noise and which selectively generates an information signal which includes undesirable noise. The circuitry comprises first, second and third means. The first means is coupled to the solid state imaging apparatus for selectively sampling and holding the reference signal. The second means is coupled to the solid state imaging apparatus for selectively sampling and holding the information signal. The third means is coupled to the first and second means for subtracting the reference and information signals from ea:h other so as to generate a circuitry output signal which is free of the noise of the reference and information signals. The solid state imaging apparatus and the first and second means are formed on a common semiconductor body which does not include the third means.

In another embodiment the processing circuitry comprises first, second and third Sample and Hold (S/H) circuits, first and second essentially identical source followers and subtraction means. The S/H circuits each have a control terminal, an input terminal and an output terminal. The input terminals of the first and third S/H circuits are coupled together to a circuitry input terminal. The output terminal of the first S/H circuit is coupled to the input terminal of the second S/H circuit and the output terminal of the third S/H circuit is coupled to the a control terminal of the second sour:e follower. The output of the second S/H circuit is coupled to a control terminal of the first source follower. An output terminal of the first source follower is coupled to a first input of the subtraction means and an output terminal of the second source follower is coupled to a second input of the subtraction means. An output of the subtraction means is coupled to a processing circuitry output terminal. The S/H circuits and the source followers are formed on a common semiconductor body (substrate) which does not include the subtraction means.

In operation a reference voltage containing noise and distortions associated with the CCD of the imaging system is applied to the video image processing circuitry ("the circuitry") input terminal while the first S/H circuit is biased on so as to store the value of the applied reference voltage and noise and distortion associated therewith therein. While the first S/H circuit is biased on, the second and third S/H circuits are biased off Subsequently, the first S/H circuit is biased off and the second and third S/H circuits are biased on as a image signal having noise and distortion associated with the image sensor is applied to the circuitry input terminal and is stored in the third S/H circuit. At the same time as this occurs the reference level stored in the first S/H circuit is transferred to the second S/H circuit. The source followers generate essentially the same signals as are applied at the control terminals thereof to outputs thereof which are each coupled to a separate one of the inputs of the subtraction means. The subtraction means, which is typically a differential amplifier, subtracts the voltages applied to the inputs thereof and generates at the output thereof a difference signal which does not contain the noise and distortions of the two input signals.

Noise signals and distortions generated by operation of the CCD equally reach each of the outputs of the first and second source followers through the common semiconductor (body) substrate. These noise signals are cancelled by the subtraction means such that they are eliminated at the output of the subtraction means which is also the output terminal of the circuitry and of the imaging system. By designing the circuitry such that the subtraction means is not on the common substrate with the CCD and the rest of the circuitry, noise and distortions from the CCD can be canceled and thus do not reach the output of the processing circuitry which is also the imaging system output terminal.

The invention will be better understood from the following more detailed description taken with the accompanying drawings and claims.

DETAILED DESCRIPTION

Figure 1:
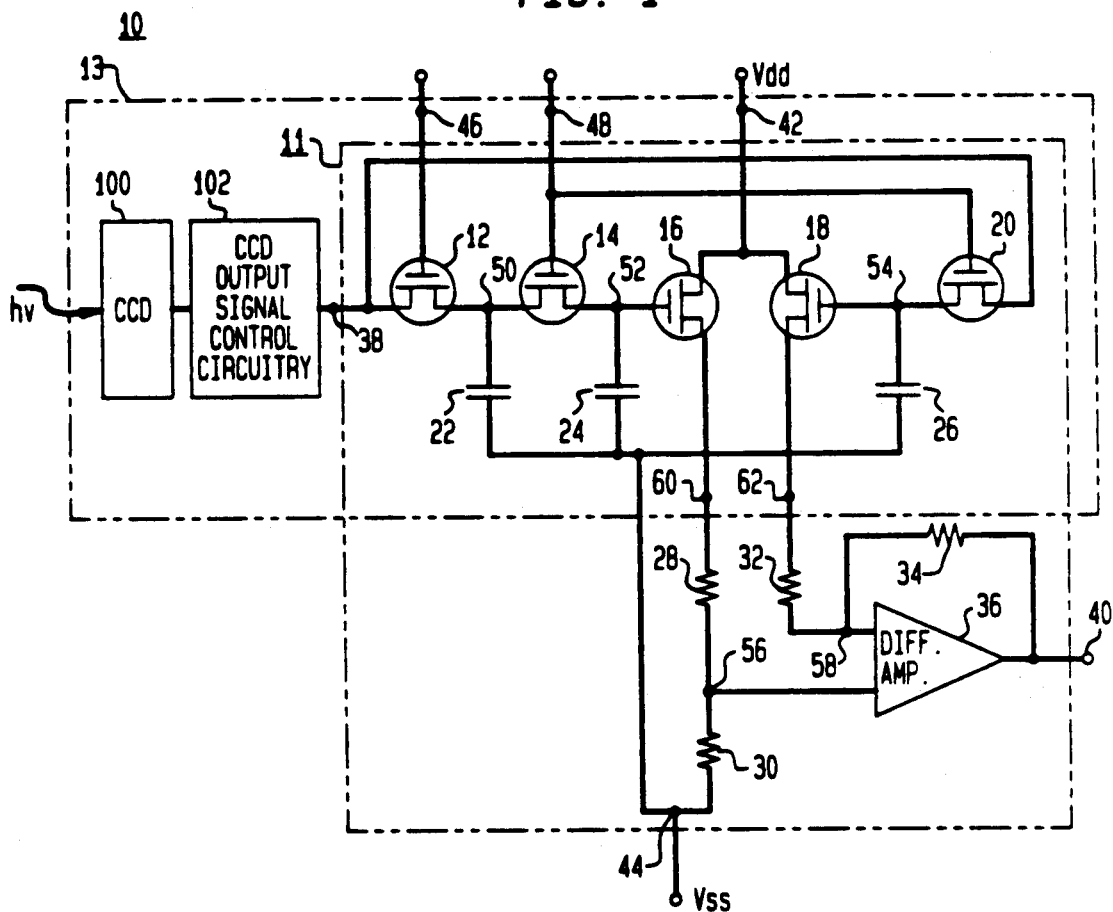
FIG. 1 is a schematic diagram of a portion of a image processing system which includes a doubly correlated sample and hOld circuit in accordance with the present invention.

Referring now to FIG. 1, there is shown a portion of a imaging system 10 comprising a Charge Coupled Device CCD 100 and CCD output signal control circuitry 102 and further comprises within a first dashed line rectangle 11 a video image processing circuit in accordance with the present invention A light signal (image) hv of arbitrary content is shown incident upon CCD 100 contained in an video camera or image sensor (not shown). Processing circuit 11 comprises n channel Metal Oxide Semiconductor Field Effect Transistors (MOSFETs) 12, 14, 16, 18 and 20, capacitors (storage means) 22, 24 and 26, resistors 28, 30, 32 and 34 and a differential amplifier (subtraction means, third means) 36. Each of transistors 12, 14, 16, 18 and 20 has a gate, a drain and a source which may also be denoted as the gate electrode (control terminal), the drain electrode (a first or second output terminal) and the source electrode (a second or first output terminal), respectively. An output of CCD 100 is coupled to an input of circuitry 102 and an output of circuitry 102 is coupled to an input terminal 38 of circuit 11 and to the drains of transistors 12 and 20. A raw video signal (dashed-line average level V3 see FIG. 2), including distortions and noise components, and a reference voltage (V2 see FIG. 2) are sequentially applied to input terminal 38 from a solid state image sensor of the type described in the field, background and summary sections of this specification. Processing circuit 11 operates to generate at an output terminal 40 thereof a substantially distortion and noise free picture or video signal V3 which is an electrical representation of the light signal (image) hv incident upon CCD 100. In a preferred embodiment of the present invention CCD 100, circuitry 102 and all of the components of processing circuit 11, except for resistors 28, 30, 32 and 34 and differential amplifier 36, are included on a single semiconductor body (substrate, integrated circuit chip) as is indicated by the second dashed line rectangle 13.

Transistor 12 and capacitor 22 form a first sample and hold circuit; transistor 14 and capacitor 24 form a second sample and hold circuit; and transistor 20 and capacitor 26 form a third sample and hold circuit. Transistors 12, 14 and 16 and capacitors 22 and 24 may be denoted as first means and transistors 18 and 20 and capacitor 26 may be denoted as second means.

The source of transistor 12 is coupled to the drain of transistor 14, to a first terminal of capacitor 22 and to a terminal 50. The source of transistor 14 is coupled to the gate of transistor 16, to a first terminal of capacitor 24 and to a terminal 52. The drains of transistors 16 and 18 are coupled together to a terminal 42 and to a positive voltage source Vdd. The source of transistor 20 is coupled to the gate of transistor 18, to a first terminal of capacitor 26 and to a terminal 54. Second terminals of capacitors 22, 24 and 26 and a first terminal of resistor 30 are all coupled tO a terminal 44 and a reference voltage Vss which is typically ground potential. The source of transistor 16 is coupled to a first terminal of resistor 28 and to a terminal 60. A second terminal of resistor 28 is coupled to a second terminal of resistor 30, to a first input of differential amplifier 36 and t: a terminal 56 The source of transistor 18 is coupled to a first terminal of resistor 32 and to a terminal 62. A second terminal of resistor 32 is coupled to a first terminal of resistor 34, to a second input of differential amplifier 36 and to a terminal 58. A second terminal of resistor 34 is couPled to an output terminal of differential amplifier 36 and to circuit 11 output terminal 40.

Figure 3:
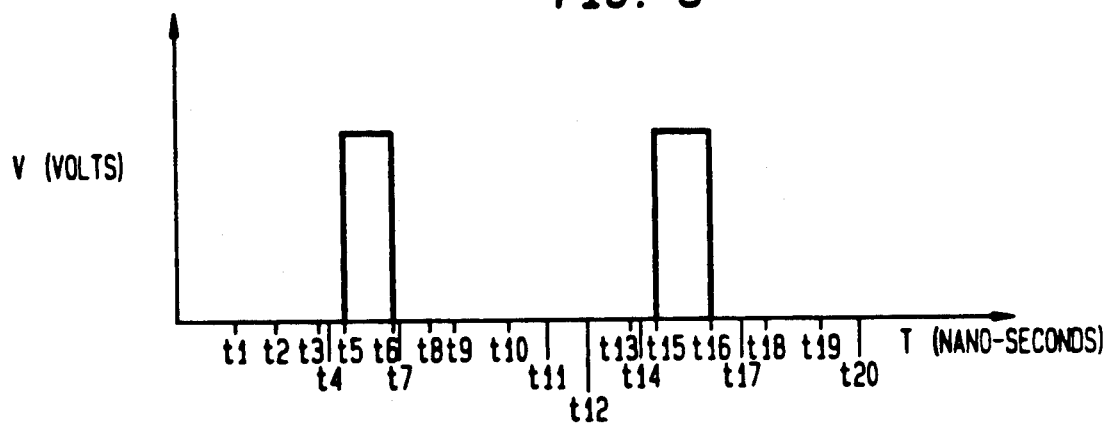
FIG. 3 graphically shows a first control signal used to control the circuit of FIG. 1.

The gate of transistor 12 is coupled to a terminal 46 to which is applied a clamp voltage wave form shown in FIG. 3. The gates of transistors 14 and 20 are coupled to a terminal 48 to which are applied a sample voltage wave form shown in FIG. 4. Transistors 14 and 20 are essentially identical as are transistors 16 and 18. The capacitance of capacitor 22 is typically about an order of magnitude or greater than the capacitance of capacitor 24. The capacitances of capacitors 24 and 26 are essentially equal.

Figure 2:
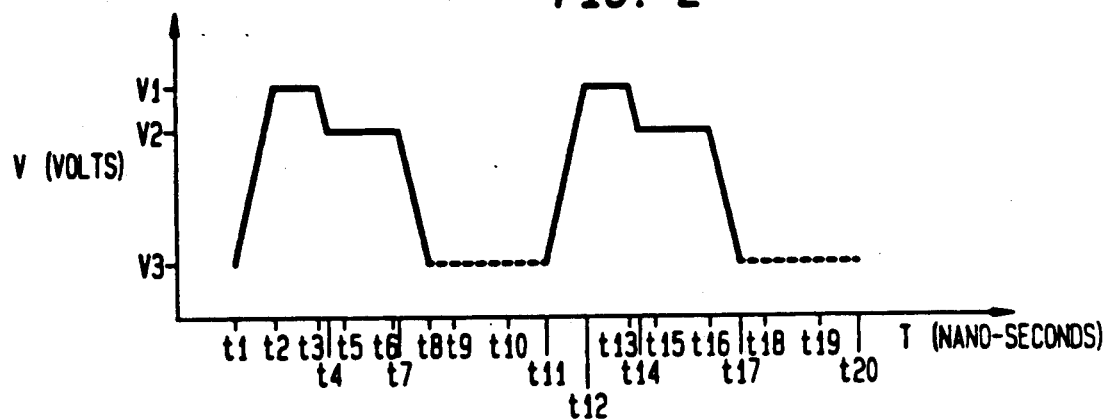
FIG. 2 graphically shows an input signal to the circuit of FIG. 1.

Referring now to FIG. 2, there is graphically shown an illustrative output signal from circuitry 102 which is applied to input terminal 38 with voltage V(volts) plotted on the y axis and time T(nano seconds) plotted on the x axis. Between T=t1 and t2, circuitry 102 provides a reset which at T =t2 leaves input terminal 38 at a voltage level V1 that is maintained in the time period T=t2 to t3. Between T=t3 and t4 the wave form applied to input terminal 38 makes a transition to a reference voltage level V2 which is less positive than V1. Voltage level V2 is maintained during the time period T=t4 to t7 and contains distortions and noise associated with CCD 100 and circuitry 102. At T=t7+ a video signal is received at input terminal 38 by circuit 11. This video signal, which also contains distortions and noise associated with CCD 100 and circuitry 102, causes terminal 38 to drop to a voltage level V3 that is less positive than VZ by T=t8. The dash line between T=t8 and t11 indicates that the level of V3 is a function of the video signal received. At T=t11 a first cycle of operation is comPleted and a second essentially identical cycle starts.

Referring now to FIG. 3, there is graphically shown a clamp voltage wave form applied to terminal 46 (the gate of transistor 12) with voltage V (volts) plotted on the y axis and time T(nano seconds) plotted on the x axis. The time axis of the wave form of FIG. 3 corresponds to that of FIG. 2. During the time periOds T=t5 to t6 and t15 to t16, the voltage applied to terminal 46 is a high ( a "1") which enables (biases on) transistor 12. During all other times the voltage applied to terminal 46 is a low (a "0") which disables (biases off) transistor 12.

Figure 4:
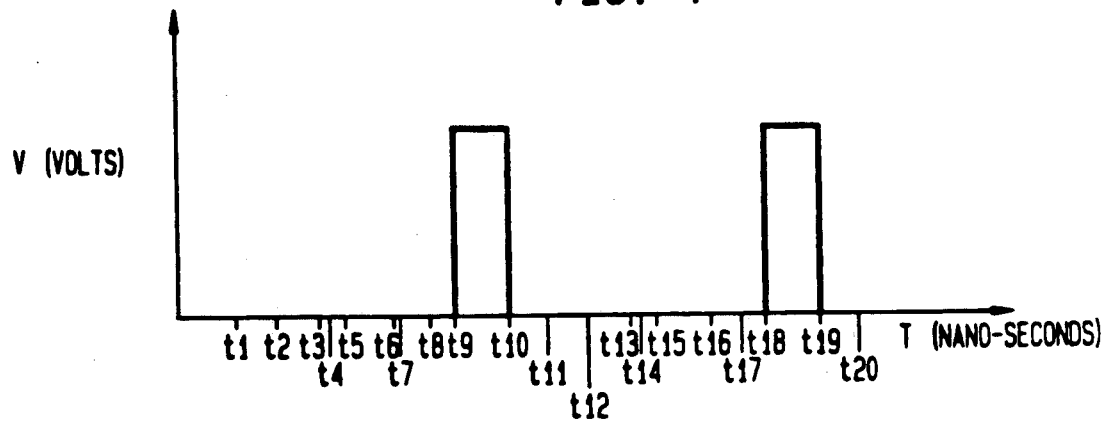
FIG. 4 graphically shows a second control signal used to control the circuit of FIG. 1.

Referring now t: FIG. 4, there is graphically shown a sample voltage wave form applied to terminal 48 (the gates of transistors 14 and 20) with voltage V (volts) plotted on the y axis and time T (nano seconds) plotted on the x axis. The time axis of the wave form of FIG. 3 corresponds to that of FIG. 2. During the time periods T=t9 to t10 and t19 to t20, the voltage applied to terminal 48 is a high ( a "1") which enables (biases on) transistors 14 and 20. During all other times the voltage applied to terminal 48 is a low (a "0") which disables (biases off) transistors 14 and 20.

Circuit 11 operates as follows: During T=t1 to t5 transistors 12, 14 and 20 are disabled (biased off) since a low, a "0", is applied to the gates (terminals 46 and 48) of transistors 12, 14 and 20. Accordingly, any signal applied to input terminal 38 is blocked from reaching capacitors 22, 24 and 26. At T=t5 the signal (see FIG. 2) applied to the gate (terminal 46) of transistor 12 is pulsed to a "1" and is held there until T=t6. This enables (biases on) transistor 12 and thus the signal applied to terminal 38 during T=t5+ to t6 is transferred through transistor 12 and is stored as the voltage level V2 in terminal 50 of capacitor 22. Transistors 14 and 20 are disabled during this time period and therefore the signal applied to input terminal 38 and to terminal 50 (the first terminal of capacitor 22) can not reach capacitors 24 and 26. By T=t6+ the voltage of terminal 50 is set to V2 which includes distortion and noise signals generated by CCD 100 and circuitry 102. At T=t6+ the voltage applied to terminal 46 (the gate of transistor 12) is a "0" and transistor 12 is disabled. This leaves capacitor 22 electrically floating in potential at the previously set level V2 which includes distortions and noise signals generated by CCD 100 and circuitry 102 electrically isolates terminal 50 from input terminal 38.

Between T=t9+ and t10−, the voltage applied to terminal 48 is set to and held at a "1" which enables transistor 14 and 20. Transistor 12 is disabled during this time period since the gate thereof (terminal 46) is held at a "0". Accordingly, with transistor 14 enabled, the charge stored in capacitor 22 is redistributed between capacitors 22 and 24. Since capacitor 22 is typically an order of magnitude greater than capacitor 24, the voltage on capacitor 24 (terminal 52) is essentially the same as the previous voltage V1 of terminal 50. In addition, the signal applied to input terminal 38 during this time period (T=t9+ to t10−) passes through enabled transistor 20 and charges capacitor 26 (terminal 54) to the voltage of a signal voltage generated by CCD 100 and transferred via circuitry 102 to input terminal 38. Accordingly, a voltage level which includes the distortion and noise of CCD 100 and circuitry 102, but no video signal, reaches terminal 52 and the output video signal voltage of CCD 100 and circuitry 102, which also includes distortion and noise of CCD 100 and circuitry 102, reaches terminal 54.

Transistors 16 and 18 act essentially as relatively high input impedance source followers. Accordingly, the voltages on terminals 60 and 62 (which are ideally the same as those on terminals 52 and 54, respectively) after appropriate voltage division by resistors 28 and 30 and 32 and 34, appear at the inputs (terminals 56 and 58, respectively) of differential amplifier 36. Since in the preferred embodiment CCD 100 and circuitry 102 and all of circuit 11, except for resistors 28, 30, 32 and 34 and differential amplifier 36, are on a common semiconductor substrate 13, any noise signals traveling via the substrate 13 equally modify the voltages appearing at terminals 60 and 62. These signals :an only reach differential amplifier 36 at the inPut terminals 56 and 58 since differential amPlifier is not on the same semiconductor substrate 13 as other comPonents of system 10 excePt for possibly resistors 28, 30, 32 and 34. Accordingly, the noise associated with CCD 100 and circuitry 102 are effectively cancelled by differential amplifier 36 and do not appear at system 10 output terminal 40. Only the desired video signal of CCD 100 and circuitry 102, essentially free of noise and distortion, reaches system 10 output terminal 40.

The circuit 11 of this invention couples noise and distortions essentially equally to terminals 60 and 62 which are coupled to an off chip 13 differential amplifier which subtracts the reference level from the video level to generate a video output signal at output terminal 40 which is the desired true video signal which is essentially free of noise and distortions.

It is to be understood that the specific components mentioned in this specification are exemplary embodiments that are intended merely to be illustrative of the spirit and scope of the claims of this invention. Modifications can readily be made by those skilled in the electronic arts consistent with the principles of this invention. For example, a variety of different sample and hold circuits can be used as :an a variety of different source followers and differential amplifiers.

I claim:

1. Circuitry comprising:
   first, second and third sample and hold circuits each having a control terminal, an input terminal and an output terminal;
   the input terminals of the first and second sample and hold circuits being coupled together to a circuitry input terminal;
   the output terminal of the first sample and hold circuit being coupled to the input of the third sample and hold circuit;
   the second and third sample and hold circuits being essentially identical;

first and second essentially identical source followers each having a control terminal and an output terminal;

the output of the second sample and hold circuit being coupled to the control terminal of the first source follower;

the output terminal of the third sample and hold circuit being coupled to the control terminal of the second source follower;

subtraction means, which has a first input coupled to the output of the first source follower, has a second input coupled to the output of the second source follower and has an output coupled to a circuitry output terminal, for during operation of the circuitry subtracting signals appearing on the outputs of the source followers from each other to generate an output signal which is the difference between signals appearing on the output terminals of the source followers; and the sample and hold circuits an the source followers being formed on a common semiconductor body which does not include the subtraction means.

2. The circuitry of claim 1 wherein the subtraction means is a differential amplifier and each of the sample and hold circuits comprises a storage means and a switching device.

3. The circuitry of claim 2 wherein each of the storage means is a capacitor, each of the switching devices is a transistor and each of the source followers is a transistor.

4. The circuitry of claim 3 wherein:

each of the transistors in an n-channel metal-oxide-semiconductor transistor;

the capacitors of the second and third sample and hold circuits are essentially identical; and the capacitor of the first sample and hold circuit is about and order of magnitude or greater than the capacitor of the second sample and hold circuit.

5. Circuitry comprising:

first, second, third, fourth and fifth field effect transistors each having a gate and first and second output terminals;

first, second and third storage means for storing information therein;

a differential amplifier having first and second inputs and an output with the output being coupled to an output terminal of the circuitry:

the first output terminals of the first and fifth transistors being coupled to an input terminal of the circuitry;

the second output terminal of the first transistor being coupled to the first output terminal of the second transistor and to the first storage means;

the second output terminal of the second transistor being coupled to the gate of the third transistor and to the second storage means;

the second output terminal of the fifth transistor being coupled to the gate of the fourth transistor and to the third storage means;

the first output terminals of the third and fourth transistors being coupled to the first and second inputs, respectively, of the differential amplifier;

the second and fifth transistors being essentially identical;

the third and fourth transistors being essentially identical;

first control means coupled to the gate of the first transistor for selectively biasing on and off the first transistor;

second control means coupled to the gates of the second and fifth transistors for selectively biasing on and off the second and fifth transistors at essentially the same time; and the first and second control means being adapted such that during operation of the circuitry either the first transistor is biased on and the second and fifth transistors are biased off or the first transistor is biased off and the second and fifth transistors are biased on.

6. The circuitry of claim 5 further comprising:

first, second, third and fourth resistors;

a first terminal of the first resistor being coupled to the first output terminal of the third transistor;

a first terminal of the second resistor being coupled to the first output terminal of the fourth transistor;

a second terminal of the first resistor being coupled to a first terminal of the third resistor and to the first input of the differential amplifier;

a second terminal of the second resistor being coupled to a first terminal of the fourth resistor and to the second input of the differential amplifier; and a second terminal of the fourth resistor being coupled to the output of the differential amplifier.

7. The circuitry of claim 6 wherein the second output terminals of the third and fourth transistors are coupled together.

8. The circuitry of claim 7 wherein:

the first, second and third storage means each comprise a separate capacitor having first and second terminals;

the first terminal of the first capacitor is coupled to the second output terminal of the first transistor and to the first output terminal of the second transistor;

the first terminal of the second capacitor is coupled to the second output terminal of the second transistor and to the gate of the third transistor; and the first terminal of the third capacitor is coupled to the second output terminal of the fifth transistor and to the gate of the fourth transistor.

9. The circuitry of claim 8 wherein the second terminals of the capacitors and the second terminal of the third resistor are all coupled together.

10. The circuitry of claim 9 wherein the second and third capacitors have essentially equal values of capacitance and the capacitance of the first capacitor is about an order of magnitude or greater than that of the second capacitor.

11. The circuitry of claim 10 wherein the second output terminals of the third and fourth transistors are adapted to be coupled to a first voltage source and the second terminals of the capacitors and the second terminal of the third resistor are adapted to be coupled to a second voltage source.

12. The circuitry of claim 11 wherein all of the transistors are n channel transistors.

13. The circuitry of claim 12 wherein all the transistors and capacitors are formed in a common semiconductor substrate which does not include the differential amplifier.

14. The circuitry of claim 13 wherein the first, second, third and fourth resistors are not included in the common semiconductor substrate which is silicon.

15. The circuitry of claim 14 wherein all of the n/channel transistors are insulated gate field effect transistors and the substrate is silicon.

16. Circuitry comprising:
first, second and third sample and hold means each having and input and an output and a control terminal for receiving and storing information;
the inputs of the first and third sample and hold means being coupled to an input terminal of the circuitry;
the output of the first sample and hold means being coupled to the input of the second sample and hold means;
the control terminals of the second and third sample and hold means being coupled together;
first control means coupled to the control terminal of the first sample and hold means for selectively biasing on the first sample and hold means;
second control means coupled to the control terminals of the second and third sample and hold means for selectively biasing on the second and third sample and hold means at essentially the same time;
the first and second control means being adapted such that during operation of the circuitry either the first sample and hold means is biased on and the second and third sample and hold means are biased off or the first sample and hold means is biased off and the second and third sample and hold means are biased on;
first and second essentially identical source followers each having a control terminal and first and second output terminals;
the output of the second sample and hold circuit being coupled to the control terminal of the first source follower;
the output of the third sample and hold circuit being coupled to the control terminal of the second source follower;
the second and third sample and hold means being essentially identical;
subtraction means, which has first and second inputs coupled to the first outputs of the first and second source followers, respectively, for subtracting an output signal of the first source follower from an output signal of the second source follower and for providing a resultant signal at an output thereof which is coupled to an output terminal of the circuitry; and
the first, second and third sample and hold means and the first and second source followers are formed in a semiconductor substrate which does not include the subtraction means.

17. The circuitry of claim 16 wherein each of the sample and hold means comprises a separate combination of a storage means and a switching device having a control terminal and first and second output terminals.

18. The circuitry of claim 17 wherein each of the switching devices is a field effect transistor and each storage means is a capacitor 19. The circuitry of claim 18 wherein each of the source followers is a switching device having a control terminal and first and second output terminals.

20. The circuitry of claim 19 wherein each of source follower switching devices is a field effect transistor.

21. The circuitry of claim 20 wherein the subtraction means is a differential amplifier having two inputs and an output with the output being coupled to the output terminal of the circuitry.

22. The circuitry of claim 21 wherein all Of the field effect transistors are n channel insulated gate field effect transistors.

23. The circuitry of claim 22 wherein all the transistors and the capacitors are formed in a common silicon substrate which is silicon and the differential amplifier is not formed in the common silicon substrate.

24. In combination:
a solid state imaging apparatus comprising a charge coupled device for generating picture elements in response to light incident thereon:
a processing circuit comprising:
a first sample and hold circuit including a first electronic switch and a first storage capacitor;
clamping means for activating said first sample and hold circuit at a first instant of time to charge said first capacitor to a reference value by way of said first switch;
a second sample and hold circuit including second and third electronic switches and second and third storage capacitors;
sampling means for activating the second and third switches in said second sample and hold circuit to transfer the reference value from said first capacitor to said second capacitor by way of said second switch and to charge said third capacitor to the value of an incident picture element value at a second instant of time;
a fourth electronic switch coupling the charged values stored in said second capacitor to a first output terminal thereof;
a fifth electronic switch coupling the charged values stored in said third capacitor to a first output terminal thereof;
subtraction means, which has a first input coupled to the first output terminal of the fourth electronic switch and which has a second input coupled to the first output terminal of the fifth electronic switch, for subtracting the reference value from the incident picture element value so as to generate at an output thereof a signal which does not contain noise associated with solid state imaging aPparatus an/or the operation thereof; and
the subtraction means being physically separate from all other components of the combination which are formed on a common semiconductor substrate.

25. The combination of claim 24 in which said electronic switches are n channel metal oxide semiconductor field effect transistors.

26. The combination of claim 25 in which the capacitance of said second capacitor is about an order of magnitude or greater than that of said first capacitor and in which the semiconductor substrate is silicon.

* * * * *